United States Patent
Vats et al.

(10) Patent No.: US 8,621,412 B1
(45) Date of Patent: Dec. 31, 2013

(54) MICRO-REGIONS FOR AUTO PLACE AND ROUTE OPTIMIZATION

(75) Inventors: Suparn Vats, Fremont, CA (US); John H. Mylius, Gilroy, CA (US); Karthik Rajagopal, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/610,638

(22) Filed: Sep. 11, 2012

(51) Int. Cl.
*G06F 17/50* (2006.01)

(52) U.S. Cl.
USPC .......................................................... 716/125

(58) Field of Classification Search
USPC .......................................................... 716/125
See application file for complete search history.

(56) References Cited

U.S. PATENT DOCUMENTS

| | | | |
|---|---|---|---|
| 6,763,510 B2 | 7/2004 | Tanaka | |
| 7,581,197 B2 | 8/2009 | Arunachalam | |
| 7,937,682 B2 | 5/2011 | Arunachalam et al. | |
| 7,941,776 B2 | 5/2011 | Majumder et al. | |
| 2001/0009031 A1* | 7/2001 | Nitta et al. | 716/13 |
| 2006/0031802 A1* | 2/2006 | Alpert et al. | 716/10 |
| 2007/0150846 A1* | 6/2007 | Furnish et al. | 716/8 |
| 2011/0289471 A1* | 11/2011 | Anikin et al. | 716/132 |
| 2012/0036488 A1 | 2/2012 | Arunachalam et al. | |

* cited by examiner

*Primary Examiner* — Vuthe Siek
*Assistant Examiner* — Mohammed Alam
(74) *Attorney, Agent, or Firm* — Rory D. Rankin; Meyertons, Hood, Kivlin, Kowert & Goetzel, P.C.

(57) ABSTRACT

Techniques are disclosed for partitioning a placement of a circuit design into a plurality of regions. A constraint is generated based on the partitioning of the placement and on the sequential elements that are located within each region. The constraint is provided to one or more design tools, and the constraint forces sequential elements to fall within the same region on the next placement. Some regions can be classified as guides, and these regions act as a recommendation for a design tool instead of as an explicit rule. Other regions can be classified as inclusive, and sequential elements can be allowed to enter the region but any sequential elements already in the region must stay in the region. Further regions can be classified as exclusive, and no sequential elements may enter or leave these regions on the next placement of the circuit design.

28 Claims, 8 Drawing Sheets

Micro-Region Specification 68

Region 60
Region Type: Exclusive
Sequentials: 32, 36
X Coordinates: 0 to 2
Y Coordinates: 0 to 1
Region 62
Region Type: Exclusive
Sequentials: 46, 48
X Coordinates: 2 to 4
Y Coordinates: 0 to 1
Region 64
Region Type: Exclusive
Sequentials: 38, 40, 42
X Coordinates: 0 to 2
Y Coordinates: 1 to 2
Region 66
Region Type: Exclusive
Sequentials: 52, 54
X Coordinates: 2 to 4
Y Coordinates: 1 to 2

MICRO-REGIONS FOR AUTO PLACE AND ROUTE OPTIMIZATION

BACKGROUND

1. Field of the Invention

The present invention relates generally to electronic design techniques used for designing integrated circuits, and in particular to methods and mechanisms for optimizing the design flow used to process integrated circuit designs.

2. Description of the Related Art

The design of complex and high performance integrated circuits requires a considerable investment of time and cost. Typically, designers of integrated circuits follow multiple steps and use multiple software design tools to create a fabricated chip. Initially, the designer may use a hardware description language (HDL), such as Verilog or VHDL, to describe the original design. Then, the design may be synthesized by a synthesis tool into the logic needed to implement the desired logical functionality of the design. This may be followed by the generation of a description at the transistor and circuit component level. The next step may be the layout step where the circuit elements are placed within the overall circuit. Then, following the layout step, the wiring between the placed circuit elements may be arranged and routed.

When designing an integrated circuit, this design flow may be traversed hundreds of times or more from start to finish. After each pass through the design flow, simulations may be run on the placed and routed design to evaluate its performance. The design may need to meet various predetermined performance goals, including desired clock speed and power consumption. Additionally, any flaws or undesired behavior may be corrected by making changes to the design and then making another pass through the design flow.

As the design is nearing completion, typically only minor changes are made to the design for each iteration. However, a drastically different placement and routing of the design may be produced by the tools of the design flow even for small changes to the design. As such, the results of the implementation tools of a slightly different version of the design do not leverage the results of the previous version of the design. Therefore, there may not be any significant improvement in the quality of results or execution time from one design version to another. This may be undesirable when the design is fairly convergent and performing close to the desired result. Such unpredictability in the place and route construction and quality of results can have a negative impact on tight time to market schedules.

SUMMARY

In one embodiment, a previous best place-and-route run result may be used to generate a detailed set of physical region constraints (or micro-regions) of the placement of all sequential elements in the design. The micro-regions may be generated at a user specified level of granularity. The micro-region based physical constraints may then be fed into the next place-and-route construction build along with the register-transfer level (RTL) definition of the design and other physical updates, such as pin locations, I/O timing constraints, etc.

In one embodiment, micro-region constraints may be provided to a placement tool. The placement tool may be any type of placement tool that is part of a design flow, such as a synthesis and placement tool, place and route tool, or other tool. The design flow may include multiple tools for processing the digital design of the integrated circuit.

In one embodiment, the micro-region constraints may be based on a previous run of the design through the design flow. In a typical scenario, the previous run through the design flow may have produced a fairly convergent design. The RTL definition of the design may have changed slightly from the previous run, and instead of starting a completely new run through the design flow, which may produce materially different results, the micro-region constraints may provide the next run with a starting point that allows some flexibility to the tools but prevents a completely differently design layout from being generated.

In one embodiment, in order to generate the micro-region constraints, a grid may be overlaid on top of the place-and-route result of the previous design flow. The grid may be rectangular and may partition the chip design layout into a plurality of micro-regions. In one embodiment, the layout of the micro-regions on top of the place-and-route result may be user configurable. For example, the user may select the number of micro-regions in the grid. Alternatively, the micro-regions may be automatically selected via a software program that bases its decisions on the design and the changes that were made after the previous run through the design flow.

In one embodiment, after the design is partitioned into a plurality of micro-regions, the sequentials that reside within each micro-region may be recorded. Then, sequentials that belong to a given micro-region may be forced to stay in that given micro-region on the next run through the design flow. In some embodiments, each micro-region may be defined as one of a plurality of types of micro-regions. For example, in one embodiment, the different types of micro-regions may be guides, inclusive, and/or exclusive. The classification of micro-regions may be automatically chosen by software or manually chosen, depending on the embodiment. Similarly, the sizes of micro-regions may be automatically chosen by software or manually chosen, depending on the embodiment.

In one embodiment, changes may be made to the design after the previous best run through the design flow. The changes may be made for various reasons, and the changes may be to the physical design and/or may be changes to the constraints provided to the tools of the design flow. In one embodiment, a script may be utilized, and the script may compare the current RTL of the design to the RTL of the previous iteration of the design. The script may determine in which modules the changes fall, and then the modules may be mapped to their locations within the most recent iteration of the placement results. Then, when specifying the micro-regions, the areas with the most changes may be given larger micro-regions to give the placement tool(s) more flexibility to find the optimum placement of the sequentials in these areas. For the areas that are predominately the same, the micro-regions may be made smaller to lock in the previously generated layout. Furthermore, the type of micro-region used for a specific area in the design may be based on the amount of changes in that area.

A micro-region specification may be generated based on the partitioning of the design and the sequentials that belong to each micro-region. Then, the micro-region specification may be fed as a constraint into one or more placement tools within the design flow. The specification may be a seed for each placement tool, and the placement tool may use the specification to determine how to place the sequentials within the layout. For example, in one embodiment, any guide micro-regions may be considered recommendations, and the tool may attempt to place the sequentials in their assigned micro-region. Inclusive micro-regions may prevent sequentials from leaving their assigned micro-region but may allow other, external sequentials to be placed in the micro-region.

Exclusive micro-regions may prevent sequentials from entering or leaving the micro-region, such that the sequentials that were in the micro-region in the previous layout may remain in the micro-region for the current layout.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which.

DETAILED DESCRIPTION OF EMBODIMENTS

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A system comprising a design tool . . . ." Such a claim does not foreclose the system from including additional components (e.g., a memory device, a display).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., a field programmable gate array (FPGA) or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, in a tool chain design flow having five design tools, the terms "first" and "second" design tools can be used to refer to any two of the five design tools.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Figure 1:
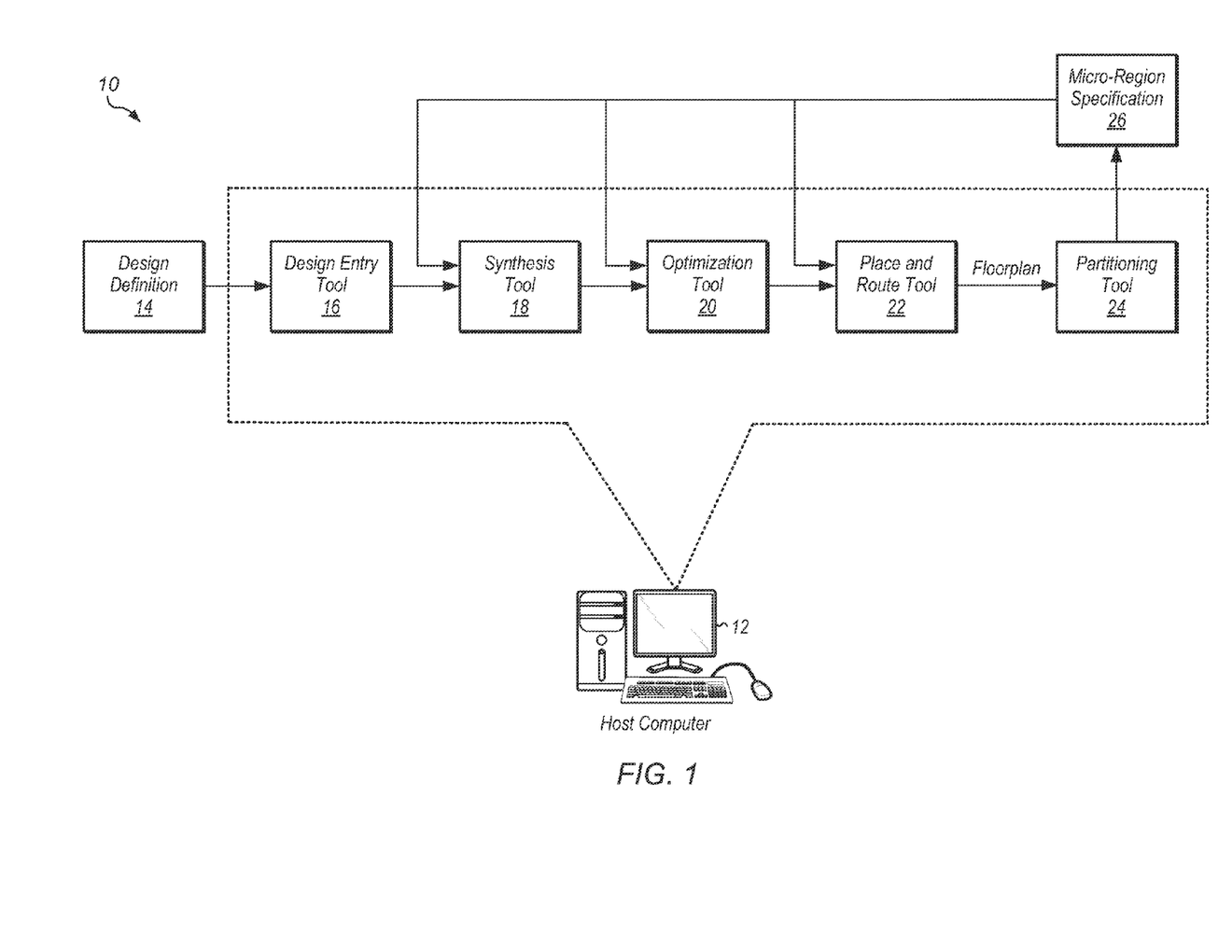
FIG. 1 is a block diagram illustrating one embodiment of a tool chain design flow.

Referring now to FIG. 1, a block diagram illustrating one embodiment of a tool chain design flow 10 is shown. In the illustrated embodiment, tool chain design flow 10 may include one or more computing systems (e.g., host computer 12) configured to execute various design tools. Host computer 12 is representative of any number and type of personal computers, laptops, servers, or workstations, such as an Apple® Macintosh® computer or the like. In other embodiments, host computer 12 may be any type of computing device such as a smartphone, tablet, or the like.

In one embodiment, all of the design tools of design flow 10 may execute on a single host computer 12. In other embodiments, some of the design tools may execute on a first host computer, some of the design tools may execute on a second host computer, other design tools may execute on a third host computer, and so on. In various embodiments, the design tools may be software programs executing on host computer 12. In other embodiments, one or more of the design tools may be a combination of software and a dedicated hardware machine specially designed to execute the design tool. In further embodiments, one or more of the design tools of design flow 10 may be software, hardware, or any combination thereof.

In one embodiment, design entry tool 16 may be configured to receive a design definition 14 and generate a functional description of the circuit design. The design definition 14 may include a plurality of circuit elements, such as sequentials (or flip-flops), memories, combinatorial logic, and the like, connected together via wiring nets. In one embodiment, design entry tool 16 may include a graphical interface through which a designer connects symbols and blocks representing various components to produce a schematic description of the circuit design. In some embodiments, design entry tool 16 may include a text interface through which a programmer writes hardware description language (HDL) code in any HDL (e.g., Verilog, VHDL) to produce a structural and/or behavioral description of the circuit design in terms of HDL constructs.

In one embodiment, synthesis tool 18 may be configured to receive the circuit design generated by the designer using design entry tool 16. Synthesis tool 18 may be configured to process the circuit design to produce a netlist of the circuit design. In some embodiments, synthesis tool 18 may be a physical aware synthesis tool that performs both synthesis and placement of the circuit elements. Optimization tool 20 may be configured to optimize the netlist generated by synthesis tool 18. Place and route (P&R) tool 22 may be configured to process the output generated by optimization tool 20. P&R tool 22 may place the physical components within the target device (e.g., FPGA, PLD, ASIC) and route interconnects between the placed components. P&R tool 22 may also be referred to as a placement tool or as a placement unit.

In one embodiment, there may be additional tools following P&R tool 22 in tool chain design flow 10. It is noted that P&R tool 22 may be split up into a separate place tool and a separate routing tool in other embodiments. Furthermore, other tools in the design flow 10 may also be split up into two or more separate tools. Alternatively, two or more of the tools in the tool flow may be combined into a single tool. It is noted that tool chain design flow 10 may include other tools, software, and/or hardware not shown in FIG. 1. Also, one or more of the tools shown in FIG. 1 may be omitted from design flow 10 in other embodiments. Still further, the order of tools in design flow 10 may be rearranged in other embodiments.

After a placement of a given floorplan of the design is created on the first pass through design flow 10, the placement/floorplan may be partitioned into a plurality of regions by partitioning tool 24. It is noted that partitioning tool 24 may also be referred to as a partitioning unit. The partitioning performed by partitioning tool 24 may be flexible and may be dependent on a variety of factors. For example, after the next iteration of the source circuit design is finished and ready to be processed by design flow 10, then the partitioning of the resultant floorplan of the previous design flow may be performed. The partitioning may be based in part on the amount and location of changes in the design from the previous iteration of the design. The logic elements that are located in each region may be determined and then on the subsequent layout of the design, the movement of the logic elements may be restricted based on their assigned region. In one embodiment, the logic elements may include sequential elements, combinational elements, combinations thereof, control units (e.g., arithmetic logic units (ALUs)), and other components. In another embodiment, the logic elements may include only sequential elements. The partitioning of the placed design and the locations of logic elements may be defined in micro-region specification 26, which may be generated by partitioning tool 24. Micro-region specification 26 may be used in the subsequent pass through design flow 10 by one or more of the various design tools of design flow 10. As shown in FIG. 1, micro-region specification 26 is being provided to synthesis tool 18, optimization tool 20, and P&R tool 22. It is noted that although not shown in FIG. 1, one or more other constraints (e.g., timing constraint, power constraint) may be provided to one or more of the tools of design flow 10. It is also noted that partitioning tool 24 may not be utilized for the final run through design flow 10. The final placement/floorplan may bypass the partitioning step implemented by partitioning tool 24 and may instead be processed by a fabrication tool (not shown) to produce an actual integrated circuit (IC), system on chip (SoC), or chip. In various embodiments, partitioning tool 24 may be utilized only when another pass through design flow 10 is going to be performed for the source circuit design.

Host computer 12 may include various hardware and software components. The hardware components may include one or more processors, memory devices, display devices, and input/output (I/O) devices, connected together via a bus architecture. The software components may include an operating system stored in a memory device. The operating system may be any of various types of operating systems, such as Apple® Mac OS or iOS, Linux®, Unix®, Solaris®, Microsoft Windows®, or others.

Figure 2:
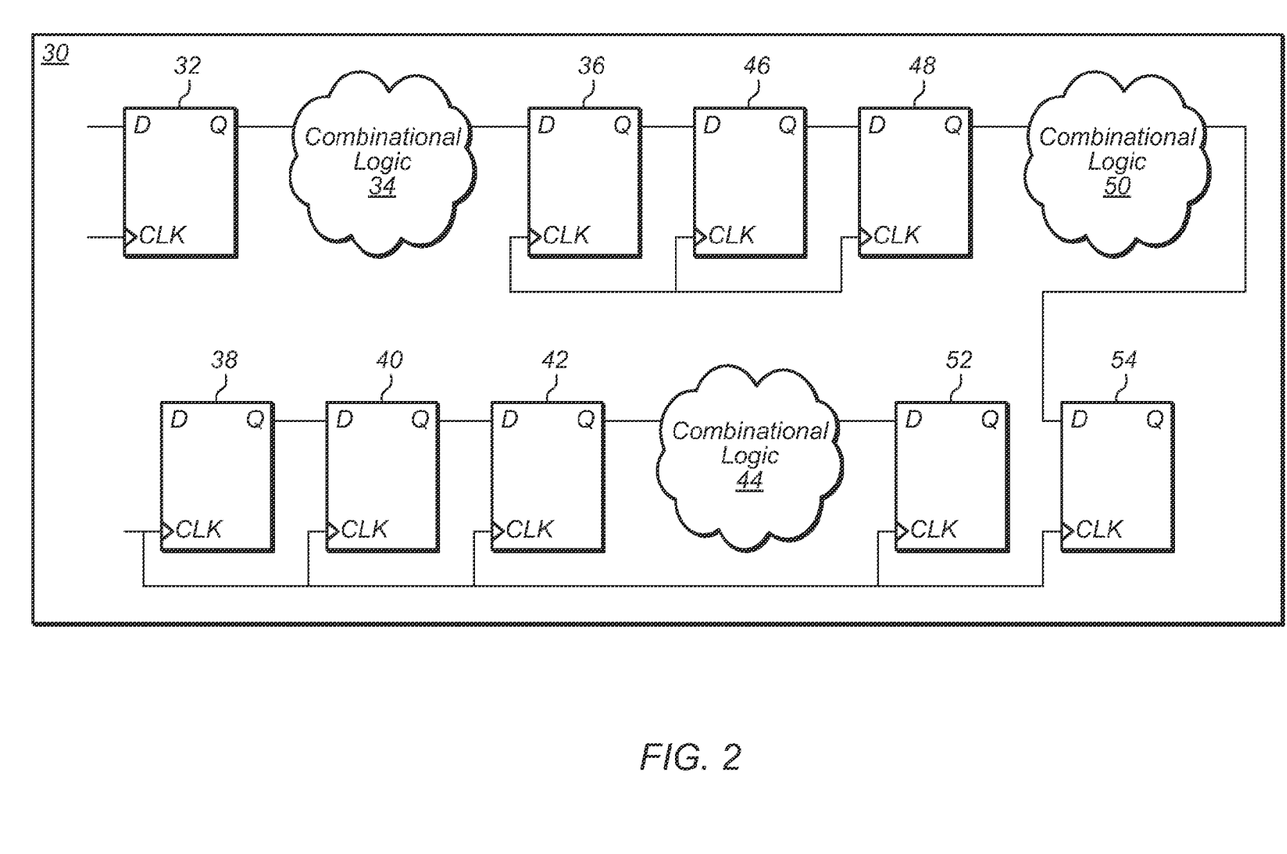
FIG. 2 is a block diagram illustrating a sample integrated circuit design layout.

Turning now to FIG. 2, a floorplan of a sample integrated circuit design layout is shown. It is to be understood that this floorplan of the sample design is used purely for illustrative purposes. For example, the number of registers and other circuit elements in an actual circuit design will often number in the millions instead of the relatively few shown in layout 30. However, to avoid cluttering the figure, only a small number of circuit elements are shown in FIG. 2. In actual designs, the methods and mechanisms described herein may be utilized even though the number of circuit elements will typically be much larger.

Layout 30 is shown with flip-flops 32, 36-42, 46-48, and 52-54. These flip-flops may also be referred to as registers, sequentials, or sequential elements. Layout 30 also includes combinatorial logic elements 34, 44, and 50 and wiring (or nets) between the various elements. Layout 30 may be a placed and routed design with the circuit elements placed within the chip area and the signals routed between the various elements. Layout 30 may have been designed using a variety of techniques, and may have been generated using a design flow similar to that shown in FIG. 1.

Layout 30 is one example of a placement result that may be generated by a design tool and then viewed by a programmer. Layout 30 is described in more detail below in regards to the partitioning into micro-regions that may be performed. The term "partitioning" may be defined as dividing the entirety of the design layout into non-overlapping or overlapping areas. It is also to be understood that layout 30 may not be the final iteration of the circuit design layout, and that changes may be made to the original circuit design and then the changed circuit design may be re-processed by the design flow.

In various embodiments, if layout 30 is the final iteration of the circuit design layout, then layout 30 may be fabricated into an integrated circuit (IC) or an application specific integrated circuit (ASIC), or as a system on a chip (SoC). Any of these devices may be utilized in a variety of end products, such as cell phones, smartphones, tablets, electronic reading devices, computers, servers, televisions, video game consoles, and various other products.

Figure 3:
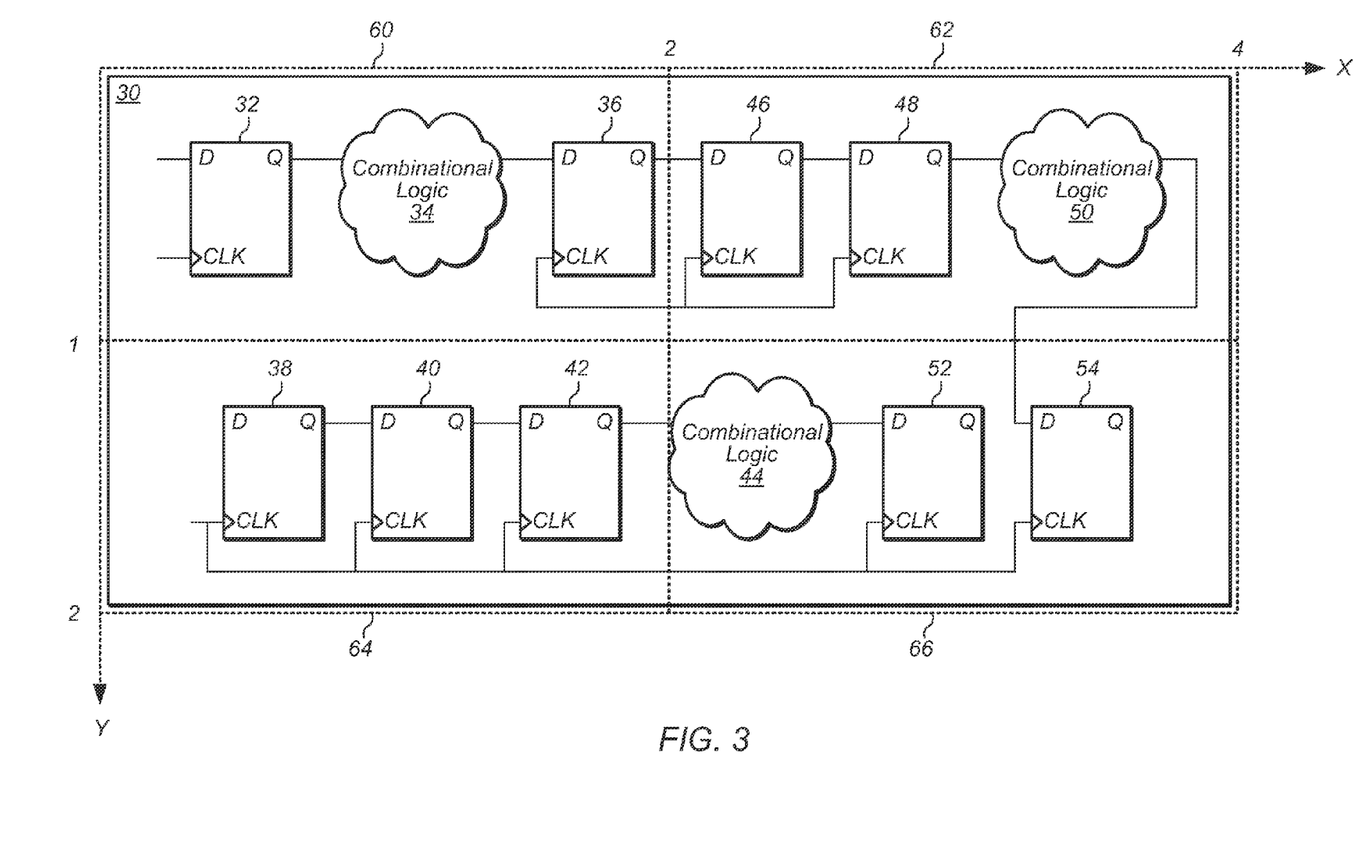
FIG. 3 is a block diagram that illustrates one embodiment of the partitioning of a circuit design layout.

Turning now to FIG. 3, one embodiment of a partitioning of a circuit layout is shown. Circuit layout 30 is the same design shown in FIG. 2, but as shown in FIG. 3, circuit layout 30 has been partitioned into a plurality of non-overlapping regions 60, 62, 64, and 66. As shown, regions 60-66 are equal-sized, but it is to be understood that this is only one possible example of a layout being partitioned. In other embodiments, circuit layout 30 may be partitioned into other numbers of regions, overlapping or non-overlapping, and the regions may or may not be equal-sized. Furthermore, the regions may be other types of shapes besides rectangles. Additionally, although the overall circuit layout 30 is shown as a rectangle, circuit layout 30 may be any type of shape in other embodiments.

After circuit layout 30 is partitioned into the regions 60-66, then the sequentials that are located in each region may be identified and assigned to their host region. In one embodiment, a list of the sequentials assigned to each region may be generated. This list of the sequentials per region may be generated automatically by a software tool based on the partitioning of layout 30. The matching of sequentials to a corresponding region may be stored and then provided as a constraint to one or more tools of the design flow. For example, the list may be provided as a constraint to a synthesis and placement tool, and the synthesis and placement tool may use the constraint as a starting point in determining how to place the sequentials of layout 30. In one embodiment, the sequentials may be allowed to be placed anywhere within their assigned region by the design tool. In other embodiments, the restrictions on the placement of sequentials may be more flexible, depending on how each region is defined by the constraint generator.

It is noted that the partitioning of layout 30 into regions 60-66 may be performed using a variety of different techniques in various embodiments. For example, in one embodiment, the partitioning may be performed manually by a user. The user may be presented with layout 30 on a display and then the user may draw the borders between the various regions using a point-and-click tool (e.g., mouse) or other input device. In another embodiment, layout 30 may be partitioned into equal-sized regions. In this embodiment, the user may select the number of regions that should be created, and then a software tool may automatically perform the partitioning of the design into the specified number of equal-sized regions.

In a further embodiment, a software tool may automatically perform the partitioning of the design layout into regions without any user input. For example, in this embodiment, the software tool may compare the current iteration of the design to the previous iteration of the design to determine what changes have occurred and what modules these changes belong to. Then, the software tool may determine in which areas of the current placement those modules are located. The areas which have the most changes may be partitioned into regions that are larger and/or less restrictive than the regions in areas with fewer changes. Larger and less restrictive regions will allow more flexibility in placing the corresponding sequentials on the design flow run for the next iteration of the design.

As shown in FIG. 3, layout 30 may be mapped onto a rectangular grid with X and Y coordinates. In one embodiment, the origin may be in the top left corner of layout 30, and the coordinates may increase in the horizontal direction going to the right and in the vertical direction going down. The X-axis is shown in a horizontal direction and the X coordinates range from 0 to 4. The Y-axis is shown in the vertical direction and the Y coordinates range from 0 to 2. In other embodiments, layout 30 may be mapped to other types of grids in any other suitable fashions.

Figure 4:
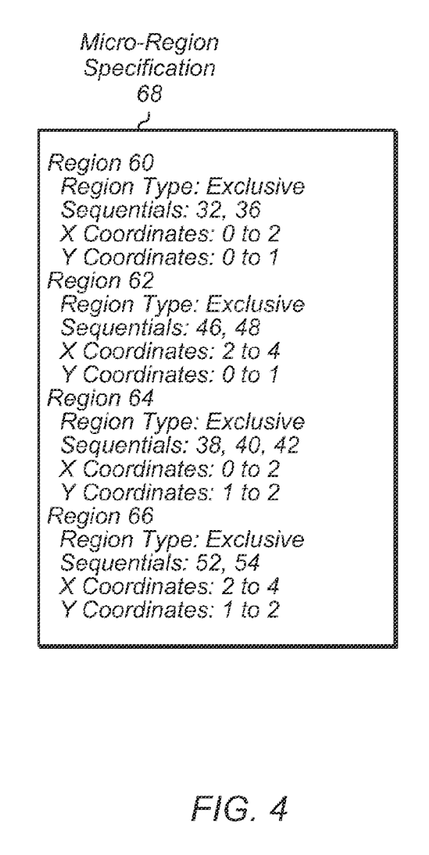
FIG. 4 is a micro-region specification for a circuit design layout.

Referring now to FIG. 4, one embodiment of a micro-region specification for an integrated circuit design is shown. Micro-region specification 68 may be generated based on the micro-regions partitioned in circuit layout 30 of FIG. 3. Micro-region specification 68 may also be referred to as a micro-region definition. It is also noted that the terms "micro-region" and "region" may be used interchangeably throughout this disclosure.

It is noted that in some embodiments, the number of flip-flops in a total design may be in the tens or hundreds of millions. In these embodiments, the micro-region specification may be significantly larger than that shown in FIG. 4. Micro-region specification 68 is merely one example of a listing that may be generated from a design floorplan following the use of at least one design placement tool in the flow.

As shown in FIG. 4, micro-region specification 68 includes a definition of each micro-region in the overall design layout. Each micro-region may be defined as one of a plurality of different types of micro-regions. The type of micro-region that is defined will affect the flexibility of movement for the sequentials that are located within the micro-region. One type of micro-region may be a guide. The guide is a recommendation of where to place the sequentials assigned to the micro-region. A design tool may attempt to place the sequentials in their assigned micro-region for those sequentials assigned to guide micro-regions, but if the tool finds a better placement for these sequentials, then the tool may place them in another region. A guide may be considered as a recommendation rather than a strict requirement on where to place the sequentials. In some embodiments, guide micro-regions may be defined for areas of the design where more changes have occurred since the previous iteration of the design. In this way, the tools of the design flow will have more flexibility in placing sequentials in these guide micro-regions.

Another type of micro-region which may be specified is an inclusive micro-region. An inclusive micro-region may allow sequentials which were outside the micro-region on a previous iteration to be located within the micro-region on the next iteration. However, the inclusive micro-region may require sequentials that were inside the micro-region on the previous iteration to stay inside the micro-region on the next iteration.

A third type of micro-region is an exclusive type of micro-region. An exclusive micro-region requires that sequentials which were inside the micro-region on a previous location to be located within the micro-region on the next iteration. An exclusive micro-region may also prevent any sequentials which were outside the micro-region on the previous iteration from moving into the micro-region on the next iteration. In one embodiment, a design floorplan may be partitioned into a plurality of micro-regions, and the floorplan may include at least one guide micro-region, at least one inclusive micro-region, and at least one exclusive micro-region. In other embodiments, other types of micro-regions may be specified.

In one embodiment, a floorplan may be generated for a first version of a design. Then, a second version of the design may be generated. The locations of the changes between the first and second version of the design may be determined, and the number of changes in the various regions of the floorplan may be calculated. In one embodiment, if the number of changes in a region is above a first threshold, then the region may be defined as a guide region. If the number of changes in a region is below a second threshold, then the region may be defined as an exclusive region. If the number of changes in a region is in between the first and second thresholds, then the region may be defined as an inclusive region. In other embodiments, other schemes may be used for determining how to define the various regions which are created by the partitioning of a circuit design floorplan.

In one embodiment, micro-region specification 68 may include an entry for each micro-region in the circuit design floorplan. As shown in micro-region specification 68, these micro-regions include micro-regions 60, 62, 64, and 66. Then, the type of micro-region may be specified on the next entry of specification 68. This entry may be followed by a listing of all sequentials that are located within this micro-region. In one embodiment, the sequentials may be identified by their instance names. In other embodiments, the sequentials may be identified by other attributes.

Finally, the coordinates of the micro-region may be listed so that the micro-region boundaries can be determined. In one embodiment, the top left corner of the design may be designated as the origin (0,0). The coordinates may be listed such that they define the micro-region in a way that the design tools may know the exact location of the micro-region within the overall placement. In the example shown in FIG. 4, it may be assumed that the regions are rectangles. Therefore, the dimensions of the regions may be specified using X and Y coordinates. In other embodiments, regions may take on any type of shape. For these embodiments, other data may be included to define the size and location of each region within the overall placement.

In other embodiments, micro-region specification 68 may be formatted in any other suitable fashion. Micro-region specification 68 may be fed into one or more tools of the design flow tool chain, and the specific format of definition 68 may depend on what the design tools of the design flow are configured to receive. In some embodiments, separate specifications may be generated from the same partitioned design layout and provided to multiple design tools, with each specification generated in the format required by each separate design tool.

After micro-region specification 68 is generated, it may be provided as a constraint to one or more tools within the design flow. In one embodiment, a design flow may include more than one design tool configured to perform a placement of the design. In some scenarios, a first design tool may generate a first placement and then the first placement may be partitioned into micro-regions. A micro-region specification may be generated based on the partitioning of the first placement, and then this micro-region specification may be provided to a second design tool later in the design flow. This may occur for a single run through the design flow for a single version of the design. Then, the second design tool may generate a second placement, and then a second micro-region specification may be generated based on a partitioning of the second placement. The second micro-region specification may be provided back to the first design tool on the next run through the design flow for the next version of the design.

Figure 5:
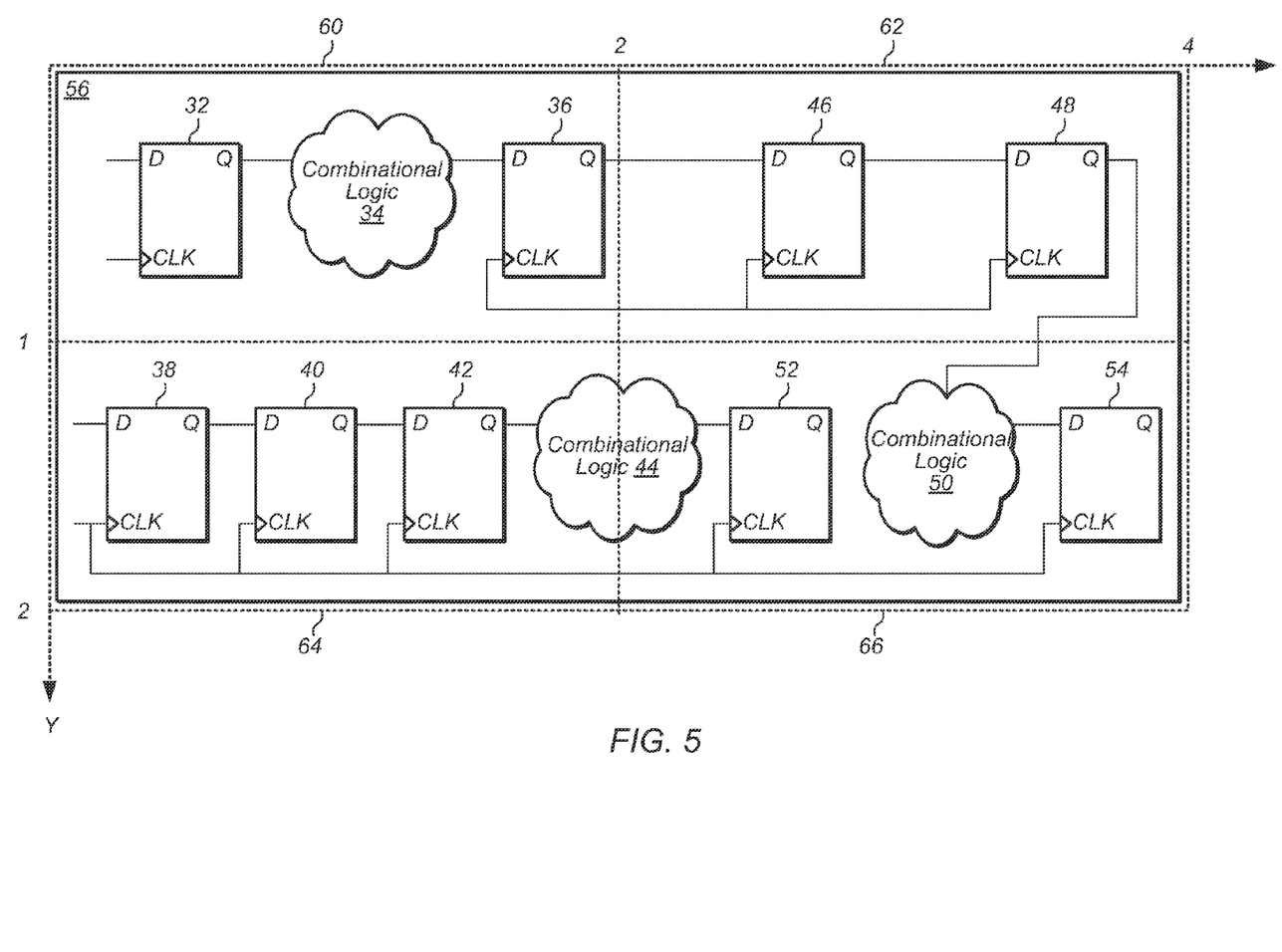
FIG. 5 is one embodiment of a second iteration of a circuit design layout.

Turning now to FIG. 5, one embodiment of a second iteration of a circuit layout is shown. Circuit layout 56 may be the result generated from another pass through the design flow for the source circuit design of layout 30 (of FIG. 3) with micro-region specification 68 (of FIG. 4) used as a constraint. In this example, no changes may have been made to the actual circuit design. However, the constraint may have been generated and provided to one or more tools for a new run through the design tool chain. The use of this constraint may result in a slightly different and improved placement of layout 56 as compared to layout 30. In other words, the design tools may be provided with a better starting point and thus may be able to generate a better placement of the circuit elements within the floorplan.

It is noted that a design may be processed by a design flow for back-to-back runs without making any changes to the actual design. However, by generating the micro-region specification and using this as a constraint for some of the design tools for the second run, the design flow may generate an improved layout of circuit elements even though the actual design itself has not changed. The layout may be improved based on a variety of factors, such as less clock skew, faster clock rate, less power consumption, etc. As can be seen from FIG. 5, the sequentials are located in the same regions in which they were located in FIG. 3. The design tools were given micro-region specification 68 as a constraint, which gave the tools the flexibility to move the sequentials anywhere within their original assigned regions. As shown, the combinational logic elements were allowed to move between separate regions.

Figure 6:
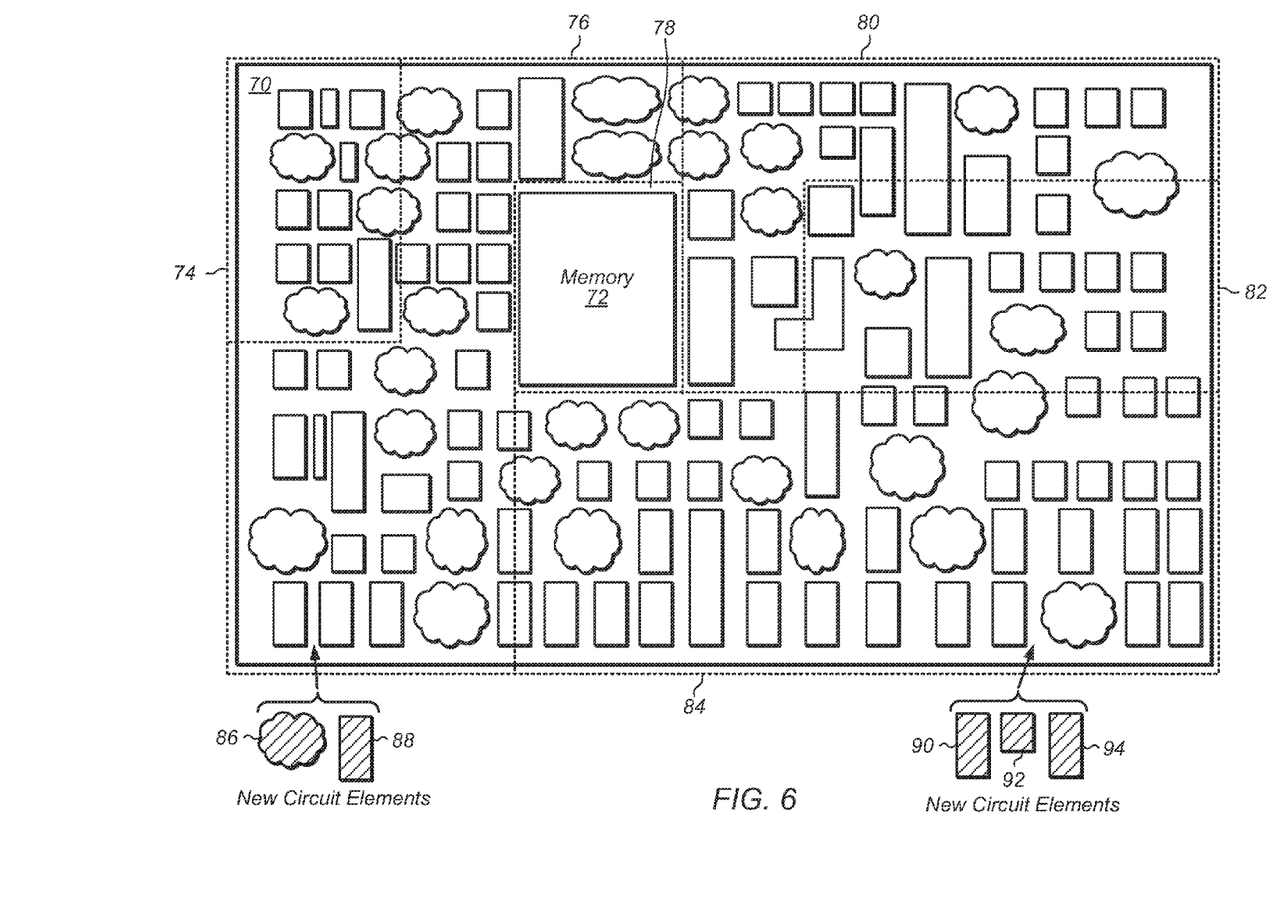
FIG. 6 is a block diagram of one embodiment of a floorplan for another circuit design.

Turning now to FIG. 6, one embodiment of a floorplan for another circuit design is shown. Circuit layout 70 includes memory 72, which is representative of any number and type of memory units. Circuit layout 70 may also include multiple sequential elements and combinational elements which are not labeled to avoid cluttering the figure.

For the purposes of this discussion, it will be assumed that the circuit layout 70 shown in FIG. 6 is the floorplan generated by a run through a tool chain design flow. Following this pass through the tool chain design flow, changes may be made to the source design. These changes are represented by new circuit elements 86-94. Once the changes have been made and the next version of the source design is ready to be processed by another pass through the design flow, circuit layout 70 may be partitioned into a plurality of micro-regions. The partitioning may be based on a variety of factors, including the probable location of the new circuit elements 86-94 within the next placement of circuit layout 70.

In the example shown in FIG. 6, new circuit elements 86 and 88 may be added in the bottom left corner of layout 70. Also, new circuit elements 90, 92, and 94 may be added to the bottom right corner of layout 70. Their probable location in the new placement may be determined based on the location of the existing circuit elements to which they are connected in the source design. As shown, the areas with the new circuit elements are partitioned into larger regions (regions 76 and 84) than the regions in areas without changes (regions 74, 78, 80, and 82) to allow more flexibility in placing the new circuit elements. In other embodiments, other changes, such as the removal of various circuit elements may be made to the design.

In one embodiment, after layout 70 is partitioned into the regions shown in FIG. 6, the new circuit elements may be assigned to their corresponding region. For example, circuit elements 86 and 88 may be assigned to region 76 in the micro-region specification that is generated from the partitioning of layout 70. Also, circuit elements 90, 92, and 94 may be assigned to region 84 in the micro-region specification. Then, the design tools which receive the micro-region specification as a constraint may be forced to place those new circuit elements in their assigned region on the next pass through the design flow. Alternatively, in another embodiment, the new circuit elements 86-94 may not be assigned to a region in the micro-region specification. Rather, these new circuit elements may be placed in any non-exclusive region by the various design tools in the design flow.

As shown in FIG. 6, layout 70 is partitioned into rectangular and non-rectangular regions. For example, region 76 is an S-shaped region and region 80 is an L-shaped region. It is noted that different types of shapes of regions (e.g., polygons) may be utilized in other embodiments. Generally speaking, there are no restrictions on the types of shapes of regions that may be used to partition a design layout. Furthermore, for circuit elements which have a boundary line passing through them, these circuit elements may be assigned to regions in a variety of ways, depending on the embodiment. For example, in one embodiment, an element which is bisected by a region boundary may belong to the region which holds the majority of the area of the element. For example, if a boundary line partitions a sequential such that 90% of the sequential falls in a first region and 10% of the sequential falls in a second region, the sequential may be assigned to the first region. In another embodiment, these sequential elements may have the flexibility to be placed in either region during the next run through the design flow. In further embodiments, other techniques for determining which region to assign a bisected sequential are possible and are contemplated.

Figure 7:
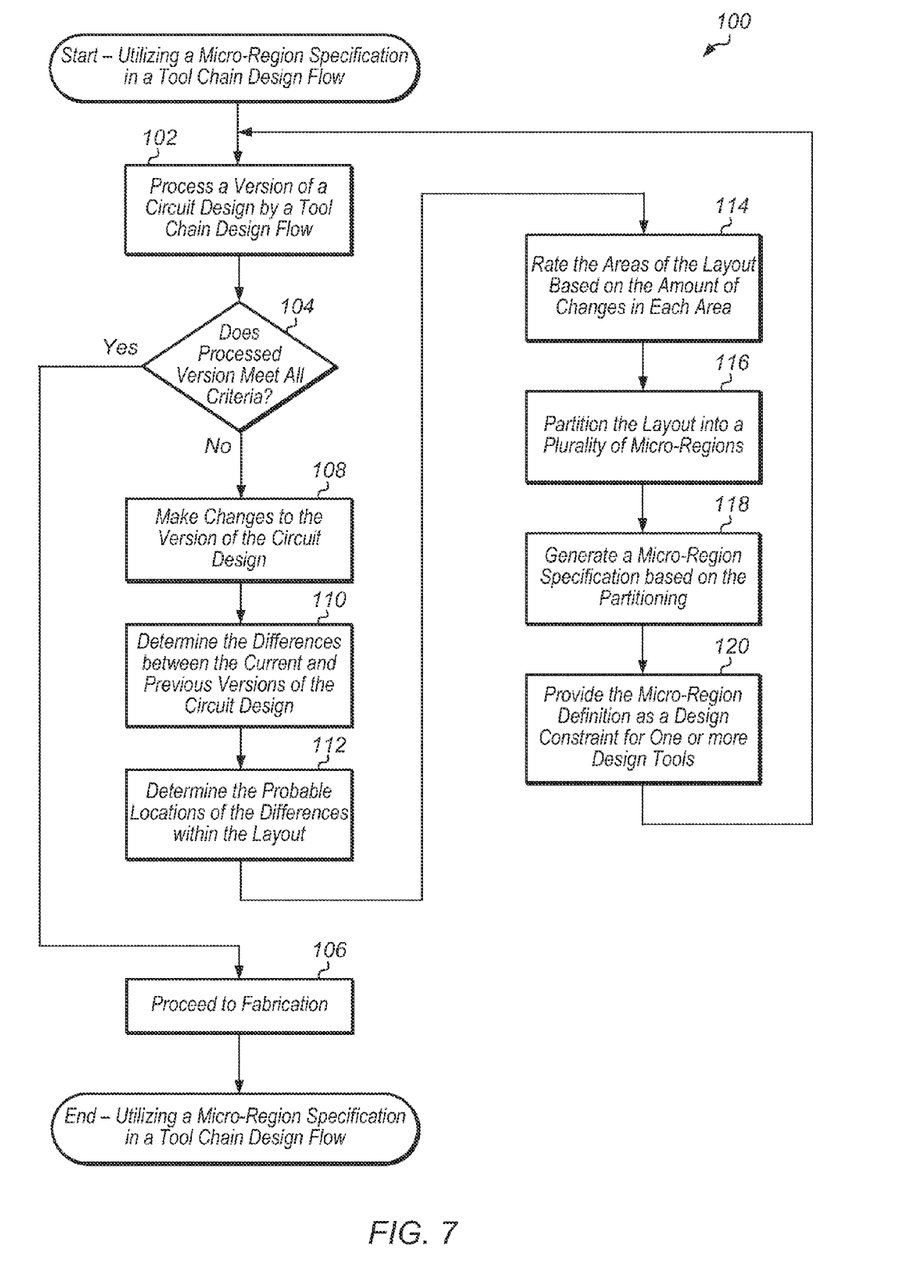
FIG. 7 is a generalized flow diagram illustrating one embodiment of a method for generating and utilizing a micro-region specification constraint in a tool chain design flow.

Referring now to FIG. 7, one embodiment of a method 100 for generating and utilizing a micro-region specification constraint in a tool chain design flow is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired. In one embodiment, method 100 may be implemented by a software application executing on host computer 12 (of FIG. 1).

The first version of a circuit design may be processed by a tool chain design flow (block 102). As part of the processing, a first version of a placed and routed floorplan may be generated from the first version of the circuit design. In one embodiment, the final tool in the tool chain design flow may be a place and route (P&R) tool, and this P&R may generate the placed and routed floorplan. Next, the designer may evaluate and/or simulate the first version of the floorplan and determine if the first version meets all of the required criteria and satisfies all performance expectations (conditional block 104). These requirements may include any number of criteria, such as timing and power criteria.

If the first version of the floorplan meets all criteria and no changes need to be made (conditional block 104, "yes" leg), then the first version of the floorplan may proceed to fabrication (block 106). If the first version of the floorplan does not meet all of the criteria (conditional block 104, "no" leg), then the designer(s) may make one or more changes to the first version of the source circuit design in an attempt to meet all of the criteria (block 108). This modified first version of the source circuit design may be referred to as the second version of the circuit design. Alternatively, the first version of the source circuit design may be referred to as the previous version and the second version may be referred to as the current version.

Next, after changes to the design have been made, software may be executed to automatically determine the differences between the first version and the second version of the circuit design (block 110). In one embodiment, the software may include a script, which may be executed to automatically determine the differences between the first and second versions of the circuit design. Then, the probable locations of the differences within the floorplan layout may be determined (block 112). The differences may be new circuit elements being added to the design and/or may be existing circuit elements being deleted from the design. In one embodiment, the probable locations of the differences may be determined based on the modules in which those differences occurred and the locations of those modules within the floorplan of the design. Next, the different areas of the floorplan layout may be rated using metrics based on the number of changes that are located within each area (block 114). For example, in one embodiment, areas with a large number of changes may be given a higher score or metric while areas with a smaller number of changes may be given a lower score or metric.

Then, the layout of the first version of the circuit design may be partitioned into a plurality of non-overlapping or overlapping micro-regions (block 116). The sizes and/or types of the micro-regions that are created may be based on the previously calculated metrics. In one embodiment, the partitioning may be performed automatically by software, and the partitioning may be based on the number of changes in the various areas of the layout. For example, in areas with a large number of changes, the micro-regions may be larger and/or more flexible (i.e., guides) to give more flexibility to the design tools to place the sequentials within this micro-region. Areas with a small number of changes may be partitioned into smaller micro-regions of the exclusive type. As a result, the placement of sequentials in these small, exclusive micro-regions may only be slightly different from the previous version of the floorplan.

Then, after the partitioning, a micro-region specification may be generated based on the partitioning (block 118). In one embodiment, the sequentials within each micro-region may be identified and tagged with a micro-region identifier to indicate in which micro-region they are located. This tracking of sequentials and determining in which micro-region they are located may be performed in any suitable manner. The partitioning of the floorplan into micro-regions and the pairing of sequentials with their corresponding micro-regions may be combined into a micro-region specification.

After the micro-region specification has been generated, the micro-region specifications may be fed back as a design constraint to one or more design tools in the tool chain design flow (block 120). In one embodiment, the micro-region specification may be fed back to each placement tool in the tool chain design flow. For example, in one embodiment, the tool chain design flow may have a physical aware synthesis design tool and a P&R tool, and the constraint may be conveyed to each of these tools. Other embodiments may have other types of placement tools. In another embodiment, the micro-region specification may only be fed back to the final placement tool in the design flow.

Then, after block 120, method 100 may return to block 102 and the second version of the circuit design may be processed by the tool chain design flow. A second set of results may be generated by the tool chain design flow for this second version of the circuit design. Then, it may be determined if the second set of results meets all of the requirements and satisfies all performance expectations (conditional block 104). The steps of method 100 may be repeated any number of times for any number of versions of the circuit design until all of the requirements are satisfied.

Figure 8:
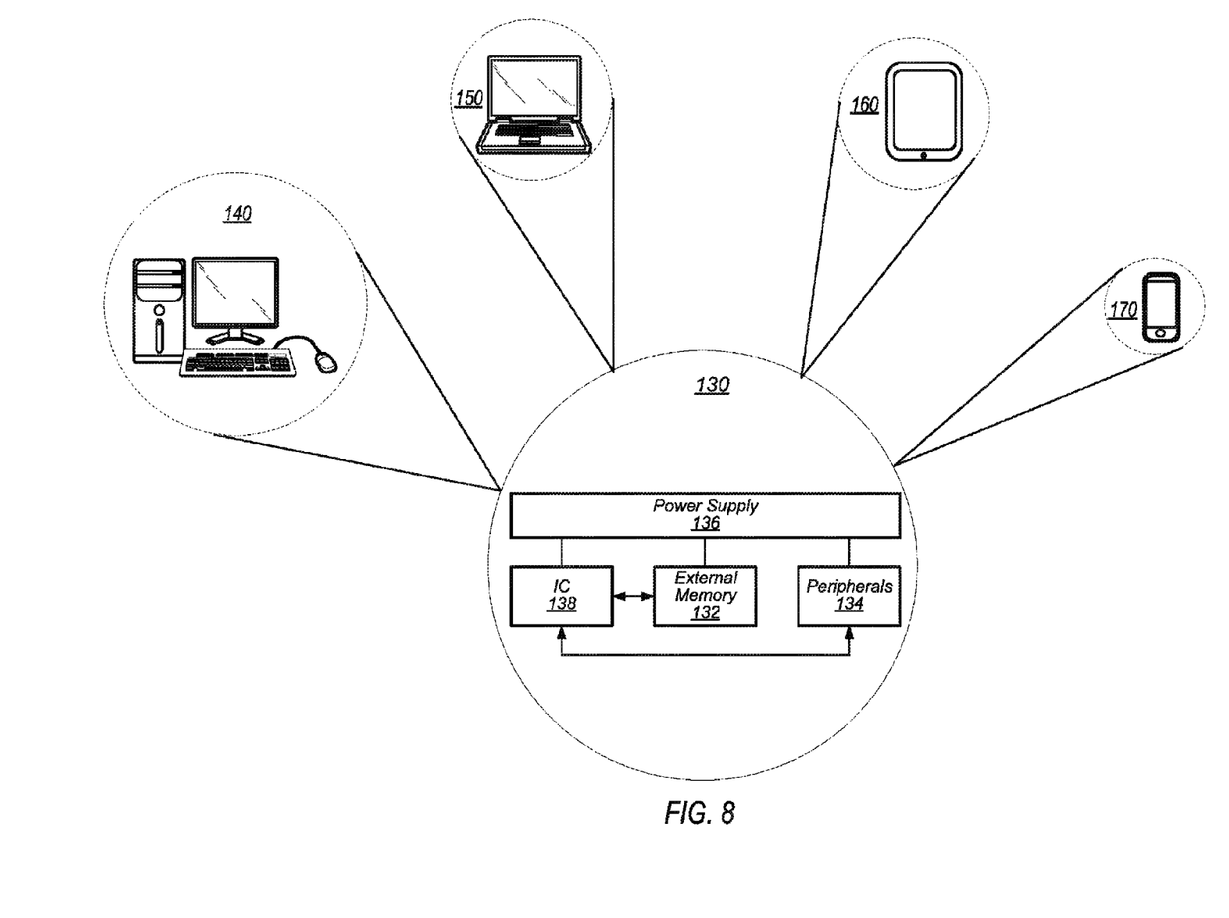
FIG. 8 is a block diagram illustrating one embodiment of a system including an IC.

Turning now to FIG. 8, a block diagram of one embodiment of a system 130 is shown. As shown, system 130 may represent chip, circuitry, components, etc., of a desktop computer 140, laptop computer 150, tablet 160, cell phone 170, or otherwise. In the illustrated embodiment, the system 130 includes at least one instance of integrated circuit (IC) 138 coupled to external memory 132.

In various embodiments, IC 138 may be based on any of the previously described designs, such as layout 30 (of FIG. 2), layout 56 (of FIG. 5), layout 70 (of FIG. 6), or other design layouts. These designs may only be a portion of the overall design which is used to produce IC 138. IC 138 is coupled to one or more peripherals 134 and the external memory 132. A power supply 136 is also provided which supplies one or more supply voltages to the IC 138, memory 132, and/or the peripherals 134. In various embodiments, power supply 136 may represent a battery (e.g., a rechargeable battery in a smart phone, laptop or tablet computer). In other embodiments, more than one power supply 136 may be provided. In some embodiments, more than one instance of IC 138 may be included (and more than one external memory 132 may be included as well).

The memory 132 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with IC 138 in a chip-on-chip configuration, a package-on-package configuration, or a multi-chip module configuration.

The peripherals 134 may include any desired circuitry, depending on the type of system 130. For example, in one embodiment, the system 130 may be a mobile device (e.g., personal digital assistant (PDA), smart phone, electronic reading device, tablet) and the peripherals 134 may include devices for various types of wireless communication, such as Wi-Fi, Bluetooth, cellular, global positioning system, etc. The peripherals 134 may also include additional storage, including RAM storage, solid state storage, or disk storage. The peripherals 134 may include user interface devices such as a display screen, including touch display screens or multitouch display screens, keyboard or other input devices, microphones, speakers, etc. In other embodiments, the system 130 may be any type of computing system (e.g., desktop personal computer, laptop, workstation, video game console, nettop).

The techniques disclosed herein can be implemented in a variety of ways including, as a system, method, and a computer readable medium. It is noted that the illustrated systems may comprise various forms and types of software. In one embodiment, program instructions and/or a database that represent the described systems, components, and/or methods may be stored on a computer readable storage medium. Generally speaking, a computer readable storage medium may include any non-transitory storage media accessible by a computer during use to provide instructions and/or data to the computer. For example, a computer readable storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g., synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM)), ROM, non-volatile memory (e.g. Flash memory) accessible via a peripheral interface such as the USB interface, etc. Storage media may include micro-electro-mechanical systems (MEMS), as well as storage media accessible via a communication medium such as a network and/or a wireless link.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A computer-implemented method comprising:
   determining by a computer one or more changes between a first version of a circuit design and a second version of the circuit design, the first version having a first floorplan;
   determining an area of the first floorplan to which the one or more changes are likely to correspond;
   partitioning the first floorplan into a plurality of regions including at least a first micro-region, wherein a size of the first micro-region is based at least in part on a number of said one or more changes; and
   generating a micro-region specification including information corresponding to at least the first micro-region wherein the micro-region specification is usable as a constraint on placement of logic elements during generation of a second floorplan for the second version of the circuit design.

2. The computer-implemented method as recited in claim 1, wherein the logic elements are sequential logic elements.

3. The computer-implemented method as recited in claim 1, wherein a first design tool is configured to generate the first floorplan from the first version of the circuit design corresponding to an integrated circuit, wherein the circuit design comprises a plurality of logic elements, and wherein the first floorplan defines a placement of the plurality of logic elements.

4. The computer-implemented method as recited in claim 3, further comprising providing the micro-region specification to the first design tool.

5. The computer-implemented method as recited in claim 4, wherein a type of the first micro-region is based at least in part on a number of said one or more changes.

6. The computer-implemented method as recited in claim 3, further comprising providing a second version of the circuit design along with the micro-region specification to the first design tool.

7. The computer-implemented method as recited in claim 6, wherein the micro-region specification defines a partitioning of the first floorplan into a plurality of micro-regions and identifies logic elements located within each of the plurality of micro-regions.

8. A computer-implemented method comprising:
   partitioning by a computer a first floorplan of a first version of a circuit design into a plurality of micro-regions including at least a first micro-region, wherein a size of the first micro-region is determined based at least in part on a number of changes likely to be located in an area that corresponds to the first micro-region; and
   generating a micro-region specification including information corresponding to at least the first micro-region; and
   utilizing the micro-region specification, wherein the micro-region specification is usable as a constraint on placement of logic elements during generation of the second floorplan for the second version of the circuit design, and wherein the micro-region specification requires each logic element in the first micro-region of the first floorplan to be located within an area corresponding to the first micro-region in the second floorplan.

9. The computer-implemented method as recited in claim 8, wherein each logic element is a sequential element.

10. The computer-implemented method as recited in claim 8, wherein a number of micro-regions used for partitioning the first floorplan is specified by a user.

11. The computer-implemented method as recited in claim 8, wherein the second floorplan is generated by a placement tool.

12. The computer-implemented method as recited in claim 11, wherein the micro-region specification defines a partitioning of the first floorplan into a plurality of micro-regions and identifies logic elements located within each of the plurality of micro-regions.

13. The computer-implemented method as recited in claim 12, wherein the second floorplan is generated subsequent to the first floorplan.

14. A computing system comprising:
a placement unit, wherein the placement unit is configured to generate a first floorplan of a first version of a circuit design and a second floorplan of a second version of the circuit design; and
a partitioning unit, wherein the partitioning unit is configured to:
partition the first floorplan into a plurality of regions including at least a first micro-region, wherein a size of the first micro-region is based at least in part on a number of changes between the first version of the circuit design and a second version of the circuit design which are located in an area corresponding to the first micro-region; and
generate a micro-region specification including information corresponding to at least the first micro-region, wherein the micro-region specification is usable as a constraint on placement of logic elements during generation of the second floorplan.

15. The computing system as recited in claim 14, wherein the logic elements comprise only sequential elements.

16. The computing system as recited in claim 14, wherein the computing system comprises two or more placement units, and wherein the partitioning unit is further configured to convey the micro-region specification to two or more placement units.

17. The computing system as recited in claim 14, wherein the partitioning unit is further configured to provide the micro-region specification to the placement unit for a subsequent pass through a design flow for a subsequent version of the circuit design.

18. The computing system as recited in claim 14, wherein each micro-region of the plurality of micro-regions is classified as one of a plurality of types of micro-regions.

19. The computing system as recited in claim 18, wherein the plurality of types of micro-regions comprise guide, inclusive, and exclusive types, wherein the first floorplan comprises a first micro-region, second micro-region, and a third micro-region, wherein the first micro-region is classified as a guide, wherein the second micro-region is classified as inclusive, and wherein the third micro-region is classified as exclusive.

20. The computing system as recited in claim 19, wherein the partitioning unit is further configured to automatically select which type of micro-region to use for each micro-region of the plurality of micro-regions.

21. A non-transitory computer readable storage medium comprising program instructions, wherein when executed the program instructions are operable to:
determine one or more changes between a first version of a circuit design and a second version of the circuit design, the first version having a corresponding first floorplan;
determine an area of the first floorplan to which the one or more changes are likely to correspond;
partition the first floorplan of the first version of the circuit design into a plurality of micro-regions including at least a first micro-region, wherein a size of the first micro-region is based at least in part on a number of said one or more changes;
generate a micro-region specification including information corresponding to at least the first micro-region, wherein the micro-region specification is usable as a constraint on placement of logic elements during generation of a second floorplan for the second version of the circuit design.

22. The non-transitory computer readable storage medium as recited in claim 21, wherein the logic elements comprise only sequential elements.

23. The non-transitory computer readable storage medium as recited in claim 21, wherein the first floorplan is generated from a first version of the circuit design, wherein prior to partitioning the first floorplan of the circuit design into a plurality of micro-regions, the program instructions are further operable to
for each micro-region of the plurality of micro-regions, determine a size of the micro-region used to partition the first floorplan based on a number of changes in the area corresponding to the micro-region.

24. The non-transitory computer readable storage medium as recited in claim 23, wherein the program instructions are further operable to specify a type of micro-region for each micro-region of the plurality of micro-regions.

25. The non-transitory computer readable storage medium as recited in claim 24, wherein the program instructions are further operable to specify a first micro-region as a guide type responsive to determining the first micro-region includes a number of changes above a first threshold.

26. The non-transitory computer readable storage medium as recited in claim 25, wherein the program instructions are further operable to specify a second micro-region as an exclusive type responsive to determining the second micro-region includes a number of changes below a second threshold.

27. The non-transitory computer readable storage medium as recited in claim 26, wherein the program instructions are further operable to
provide the micro-region specification to one or more design tools.

28. The non-transitory computer readable storage medium as recited in claim 27, wherein the one or more design tools are configured to generate the second floorplan of the second version of the circuit design.

* * * * *